Oct. 24, 1933.　　　R. B. FAGEOL ET AL　　　1,931,724
SEALING DEVICE
Filed Sept. 23, 1930　　　2 Sheets-Sheet 1
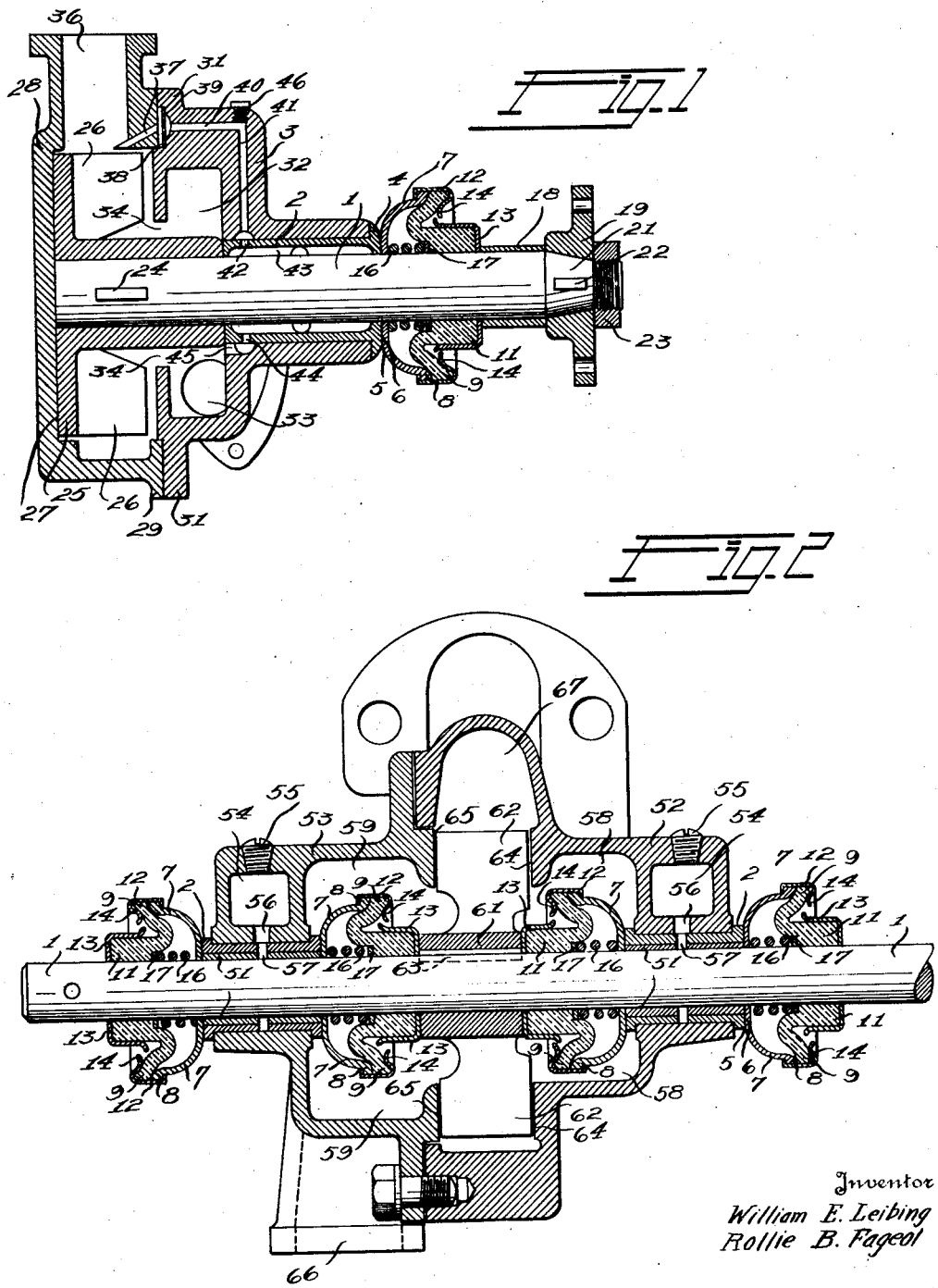
Inventor
William E. Leibing
Rollie B. Fageol Oct. 24, 1933.  R. B. FAGEOL ET AL  1,931,724
SEALING DEVICE
Filed Sept. 23, 1930  2 Sheets-Sheet 2
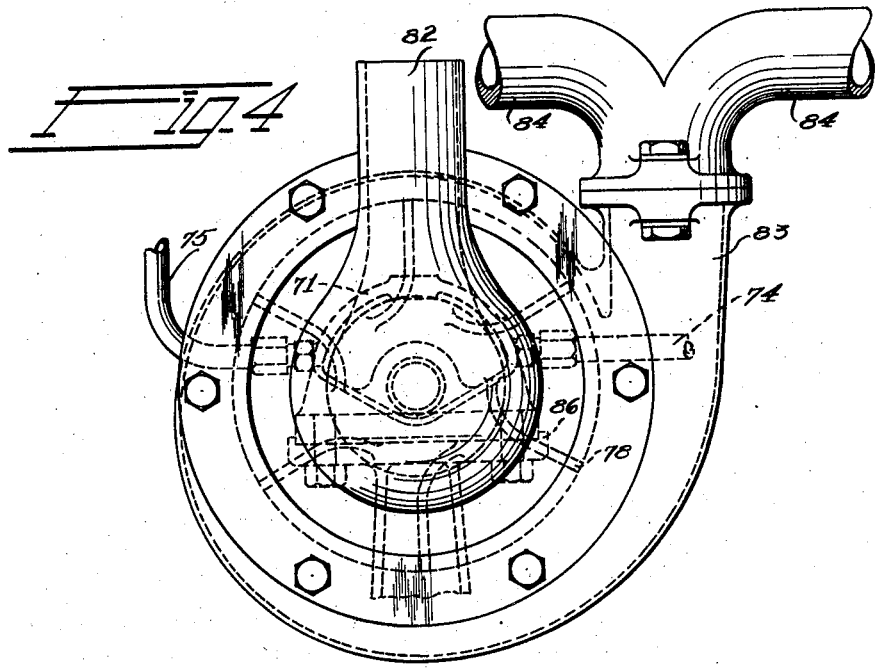
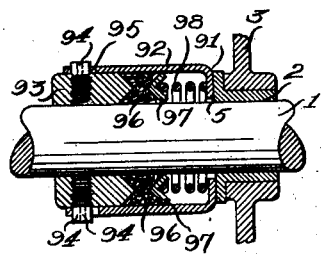
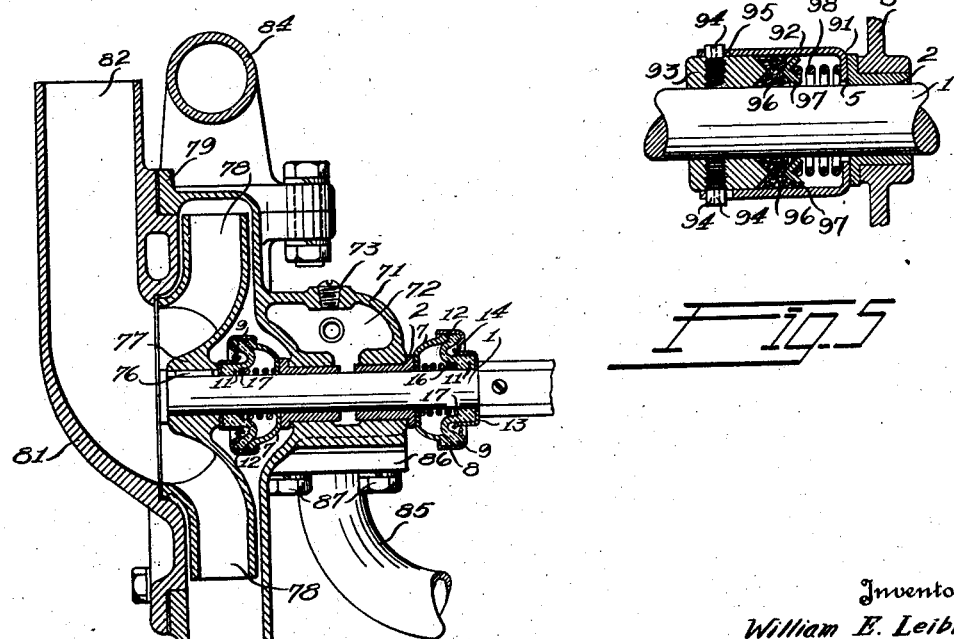
Inventor
William E. Leibing
Rollie B. Fageol Patented Oct. 24, 1933

1,931,724

UNITED STATES PATENT OFFICE 1,931,724

SEALING DEVICE

Rollie B. Fageol, Los Angeles, and William E. Leibing, Sausalito, Calif.

Application September 23, 1930
Serial No. 483,884

5 Claims. (Cl. 286—11)

This invention relates to liquid sealing devices of the type disclosed in our copending application Serial Number 374,036, filed June 27, 1929, and comprises improvements on the devices of said application.

Heretofore great difficulty has been encountered in preventing liquid or fluid contained in a housing, that supports a rotating shaft, from escaping from the housing along the shaft. The difficulty just referred to is encountered, particularly, in automotive construction, such as automotive water pumps, in which the housings contain lubricant for minimizing friction between the moving parts and the bearings therefor. The same difficulty arises in pump and fluid motor constructions of various types and in very many other relations. Various constructions have been proposed to obviate the difficulty just referred to, but such constructions have not generally been entirely satisfactory for any one of two principal reasons. The first of these reasons is that constructions proposed prior to those disclosed in said copending application that were effective in preventing the escape of liquid from the housing had only a short life, and required frequent replacement with consequent annoyances, and frequent injury to the working parts due to the loss of liquid from the housing between replacements. The second reason for the unsuitableness of constructions heretofore proposed is that they frequently imposed relatively great resistance to the rotation of the shaft relative to the housing in which it is mounted. That is, the packings or sealing devices, if arranged to successfully prevent the escape of liquid from the housing for a long period of time under conditions of service imposed substantial frictional resistances to the rotation of the shaft resulting in substantial losses of power.

The primary object of this invention is to provide liquid seals of a simple construction entirely effective to prevent the escape of liquid from a housing along a shaft journalled therein, that do not impose substantial frictional resistance to the rotation of the shaft, and that at the same time have a long life.

Another object of the invention is to provide novel sealing devices embodying non-metallic packing secured to a shaft to be sealed in a leak-proof manner for rotation as a unit with the shaft and with a metallic member arranged to slidingly bear against an annular sealing surface of a housing surrounding the exterior of the shaft.

Still another object of the invention is to provide novel pump structures to which our improved liquid sealing devices are especially adapted, and in which our sealing devices are so arranged that liquid does not injuriously contact with and shorten the life thereof.

With the above objects in view as well as others that will present themselves during the course of the following disclosure, reference will be had to the accompanying drawings forming part of same in which:

As shown in the drawings:

Figure 1 is a vertical sectional view of an improved pump construction arrangement embodying our invention.

Figure 2 is a transverse sectional view of an improved automotive water pump construction embodying our improved seals.

Figure 3 is a transverse sectional view of a modified form of automotive pump, lubricated with oil and embodying our improved seal.

Figure 4 is an end view of the form of pump shown in Figure 3.

Figure 5 is a sectional view of a modified form of seal forming part of our invention.

Referring to Figure 1, the reference numeral 1 indicates a pump drive shaft preferably of stainless steel or similar corrosion-resisting material, supported for rotation in a bearing structure 2 formed of special metallic alloy in which shaft 1 may rotate at high speed with water as the sole lubricant. Such an alloy is on the market under the trade name of Bearing-oy which may be die-cast to shape. The bearing 2 is pressed into the pump inlet housing casting 3 and is provided with the end shoulder 4 having the hardened ground face 5 against which the ground end face 6 of the hardened steel seal cup or element 7 abuts in operation. Cup 7 is provided with an annular flange 8 against which the outer edge of rubber sealing skirt or member 9 is clamped by means of the annular metallic clamping and housing member 12. Cup 7 and skirt 9 form a sealing chamber into which the fluid pressures from bearing 2 may be transmitted in operation, aiding in seating the surface 6 on surface 5.

The hub or central supporting section 11 of sealing member 9 is housed in and protected against injury on the shaft by the metallic cup 13, which is forced on and confines section 11 in sealing engagement with the shaft.

Member 12 is provided with the curved resilient end sections 14 which grip and protect the rubber sealing member 9 while permitting endwise movement of the shaft 1 together with cup 13 with relation to the remainder of the sealing assembly. It will be noted that a roll or corrugation is provided in member 9 with the convex surface forming the end wall of the sealing chamber which permits this endwise movement without stretching the rubber, and which is so arranged that internal pressure within cup 7 built up from within the sealed housing tends to force the outer ends of member 9 more securely into retaining member 12, and to force the sealing surfaces 5 and 6 more firmly together. It is also to be noted that the stresses introduced in the skirt of sealing member 9 are such as to urge the sealing surfaces 5 and 6 lightly into engagement.

A coil spring 16 surrounding shaft 1, is interposed between the inner end wall of cup 7 and a suitable metallic washer 17 which abuts against the hub section 11 of the rubber sealing member 9. Spring 16 maintains the parts in sealing relation, while permitting slight endwise movement of shaft 1 in its bearing.

Cup member 13 abuts against one end of sleeve 18 mounted on shaft 1. The opposite end of this sleeve abuts against the end of a driving coupling 19 keyed to tapered section 21 of shaft 1 by means of a key 22, and locked in position by a securing nut or collar 23 threaded on the end of the shaft.

Mounted on the inner end of shaft 1 and keyed in position by means of a key 24 is an impeller or rotor 25 provided with a plurality of radial impeller blades 26. The end face 27 of rotor 25 fits with a running clearance in a suitable rotor chamber formed in pump casting 28, flange 29 of which is secured by means of suitable bolts or cap screws to flange 31 of casting 3.

Formed in the casting 3 is an inlet chamber 32 provided with inlet port 33. Chamber 32 communicates with the rotor chamber through central annular opening 34 adjacent the inner ends of the rotor blades 26. In operation water or other fluid from chamber 32 is forced outward by centrifugal force through outlet opening 36 in the pump housing casting 28.

A duct 37 in casting 28 establishes communication with chamber 38 in casting 3, and in which strainer 39 is disposed. From chamber 38, ducts 40 and 41 establish communication through the inlet opening 42 of bearing structure 2 with chamber 43 formed in bearing structure 2 around shaft 1. Chamber 43 is provided with a lower opening 44 which communicates through duct 45 with chamber 32 of the pump.

A screw plug 46 threaded into a suitable opening in alignment with duct 41 provides access to the duct 41 for cleaning purposes.

In operation of the form of invention so far described, the sealing surfaces 5 and 6 are held in engagement and shaft 1 is held to the right by action of spring 16. Rotation of impeller blades 26 draws the fluid from chamber 32 which is supplied through inlet 33, through passage 34 into the inner ends of the impeller blades. The fluid is then forced outward by centrifugal force due to rotation of the blades and is discharged through the outlet opening 36. A part of the discharge from the impeller blades is diverted through the duct 37, chamber 38, screen 39, ducts 40 and 41, opening 42, chamber 43, and opening 44 through duct 45 back into chamber 32. In passing through chamber 43 this fluid lubricates and cools the bearings.

Loss of fluid from bearing 2 is effectively prevented by our improved sealing assembly without introducing substantial frictional resistance to rotation of shaft 1, and wear of the pump and sealing parts is automatically taken up by spring 16. At the same time any pressure that may develop within cup 7 on the rubber sealing member 9 tends to force the edges of the sealing member more securely into the retaining member 12, while the roll or corrugation in the rubber wall permits relative endwise adjusting movement of the parts in operation while maintaining a perfect seal.

In the form of our invention shown in Figure 2 a separate lubricant is utilized and a plurality of bearings are provided for the pump shaft. In this form of invention the seal construction disclosed in connection with Figure 1 is utilized, and similar reference characters will therefore be applied to similar parts, reference being had to the foregoing description for a complete understanding of the function of parts not hereinafter specifically described.

In this form of the invention, shaft 1 is extended and journalled on opposite sides of the rotor in bushings 51 supported in the bearing structures 2, each end face of each bearing structure 2 being sealed by one of our improved sealing assemblies constructed as described in connection with Figure 1. The bearing constructions 2 are mounted in pump housing castings 52 and 53 in which lubricant receiving and storing chambers 54 for the bearings are formed. Lubricant is fed into chambers 54 through the filling plugs 55, and passes through ducts 56 to the lubricant distributing channels or passages 57.

The inner sealing assemblies for the bearings are disposed in low pressure chambers 58 and 59 of castings 52 and 53, and the outer faces of cups 13 thereof abut against the hub of impeller or pump rotor 61. Impeller 61 is provided with radial blades 62 and is keyed on shaft 1 by means of the key 63. It will be noted that the impeller blades 62 fit loosely between surfaces 64 and 65 of castings 52 and 53 and are centralized between these surfaces by the action of springs 16 of the inner sealing assemblies.

Fluid is admitted to chambers 58 and 59 through inlet passage 66, passes to the center of the impeller blades 62 and is forced outward by centrifugal force through the outlet passage 67 of housing casting 52.

In this form of invention it will be noted that the bearings are lubricated from the chambers 54, and loss of lubricant from the bearings into the liquid circulated by the pump, or through the outer ends of the bearings is prevented by our improved sealing assemblies which are so arranged that there is no opportunity for lubricant to come into contact with the rubber members 9. The springs 16 of the sealing assemblies maintain the parts in sealing engagement under the wear and tear of operation.

In the form of invention shown in Figure 4 a pump arrangement is shown in which separate bearing lubricant is provided, and only two of our improved sealing assemblies are required.

In this form of our invention bearing structure 2 is supported in the pump housing casting 71 in which the lubricant chamber 72 is formed. Chamber 72 is provided with an inspection plug 73, and lubricant for the bearings is circulated through the chamber 72 by means of the lubricating circulating pipe connections 74 and 75 (Figure 4) which are preferably connected to a lubricant circulating pump. When used as a circulating pump for the cooling water of an internal combustion engine provided with a lubricant pump, an oil filter pipe 74 is preferably connected to the crank case of the engine, and the pipe 75 is connected to the oil filter, in this way providing a continuously circulating supply of cool clean oil to the chamber 72.

As will be seen sealing assemblies of the character above described seal the opposite sides of the bearing structures. Keyed to the inner end of shaft 1 by means of key 76 is the rotor or impeller structure 77 provided with the hollow circulating vanes 78. Secured to the flange 79 of casting 71 is the inlet housing 81 of the pump assembly in which the water inlet passage 82 is provided. Rotation of the shaft 1 drives the impeller 77 forcing water or liquid outward through the outlet passage 83 (Figure 4) formed in castings 72. From passage 83 the discharged fluid passes out through discharge pipes 84. The pump assembly is supported by bracket 85 provided with the supporting flange 86 to which casting 71 is secured by means of cap screws 87.

In this form of invention it will be seen that effective lubrication of the pump bearings by a continuously changing and adequate supply of lubricant is maintained, while the pump structure is effectively sealed against mixing of lubricant with the fluid being pumped or loss thereof from the outer end of the bearing.

A modified form of sealing assembly in which the use of rubber is eliminated and which is adapted for substitution for the seals hereinbefore described is shown in Figure 5.

In this form of seal the end surface 5 of the bearing 2 to be sealed is engaged by a ground surface 91 of a hardened steel sleeve member 92 surrounding shaft 1. The outer end of the sleeve member 92 fits slidably on and is supported by a collar 93 secured on shaft 1 by means of the diametrically opposite set screws 94. The outer ends of set screws 94 are smooth and project through diametrically opposite slots 95 formed in the end of sleeve 92, driving sleeve 92 with the shaft while permitting endwise sliding movement of the sleeve with relation to collar 93.

The inner end surface of collar 93 is V-shaped in section and serves as a wedging abutment for the packing that will stand up under the action of hot oil or other fluids that attack rubber, as for example, palmetto graphite string packing 96. Annular metallic wedging ring 97 of V-shape cross section is pressed against packing 96 and serves to position coil spring 98 interposed between the end wall of the sleeve member 92 and the annular member 97.

In operation of this form of packing that spring 98 presses wedging member 97 against packing 96 and forces the sleeve 92 endwise so that its surface 91 will be held in sealing engagement with the surface 5. The compression of the spring 98 is sufficient to maintain the surfaces in effective sealing engagement, and at the same time exerts sufficient pressure through annular member 97 outward and inward on packing 96 to simultaneously seal the inner surface of sleeve 92 and shaft 1 against leakage from within the interior of sleeve 92, while permitting relative endwise movement of shaft 1 and wear compensating movements of sleeve 92.

In service where our improved seal members must withstand severe operating conditions, and are likely to receive little lubricant on the running surfaces, we have found that very excellent results are secured by use of nitrated steel alloy surfaces for the running surfaces 5, 6 and 91 of extreme hardness. Excellent steel alloys are those known as "Nitralloy" made under the process of U. S. Patents 1,487,554 and 1,549,398, hardened to from 300 to 1000 or more Brinell hardness. Such surfaces, we have found, have a very low co-efficient of friction and when used for bearings will operate satisfactorily with normally inadequate lubricant and with the approximate freedom of anti-friction bearings.

From foregoing detailed descriptions of preferred embodiments of our invention it will be apparent to those skilled in the art that we have provided novel and improved seal and pump constructions, in which seals of the operating shaft against losses of fluid, are continuously maintained, slight endwise operative movement of the shafts are permitted without breaking the seals, and in which the seals automatically compensate for wear, eliminating the trouble and expense of adjusting and replacing packings in operation.

Having described preferred embodiments only of our invention, what is desired to be secured by Letters Patent and claimed as new is:

1. In a combination, a housing; a plurality of adjacent liquid chambers in said housing; a shaft journalled in said housing and projecting into said chambers, a bearing bushing surrounding said shaft, a pair of sealing devices secured to said shaft for rotation therewith, said devices being disposed on opposite sides of one of said chambers and at the ends of said bearing bushing, each of said sealing devices including an element surrounding said shaft and secured thereto to provide a liquid-tight seal and a member resiliently secured to said element and arranged in sliding sealing contact with an end of said bearing bushing that surrounds said shaft.

2. In a combination, a housing containing liquid; a shaft journalled in said housing and projecting therethrough; a bearing bushing surrounding said shaft; a sealing device mounted for rotation therewith including an element in the form of a flexible, non-metallic skirt surrounding said shaft and having a portion secured thereto to provide a liquid-tight seal; another portion of said skirt being deformed to diverge outwardly from said shaft and away from said bearing bushing and around said secured portion to provide a chamber; a member carried by the edge of said skirt to form a wall to close said chamber, said member being in sliding liquid sealing contact with an end of the bearing bushing that surrounds said shaft; and a spring housed by said skirt and arranged to urge said member against said bushing end.

3. In combination, a housing containing fluid; a shaft journalled in said housing and projecting therethrough; a bearing bushing for said shaft projecting through the housing and a sealing device secured to said shaft for rotation therewith on each side of said housing, each of said sealing devices including a member having an annular bearing surface yieldingly held in sliding liquid sealing contact with the annular end surfaces of said bushing by resilient means reacting in opposite directions against said shaft.

4. In combination, a housing containing fluid; a shaft rotatably mounted therein and protruding therethrough; bearing bushings surrounding said shaft and projecting beyond said housing providing exterior bearing surfaces of annular form, and sealing devices attached to the protruding portions of said shaft for rotation therewith, each of said sealing devices including a member having sliding liquid sealing contact with one of said surfaces; and means reacting in opposite directions on said shaft to yieldingly press said members against said surfaces.

5. In combination with a rotatable shaft; a housing wall through which said shaft extends, said wall including means for journalling the shaft, said means having an annular bearing surface; and a sealing assembly for preventing the flow of liquid past said bearing surface and along said shaft; said sealing assembly comprising a substantially rigid sleeve-like device loosely surrounding and slidable longitudinally of said shaft and formed to have a running liquid sealing contact with said annular bearing surface, and an imperforate element for sealing said shaft with respect to said rigid device, said element comprising a sleeve portion secured and sealed on the shaft and a flexible non-metallic skirt portion diverging from said sleeve portion into sealing engagement with said rigid device, said skirt portion being completely housed within said rigid sleeve-like member and being assembled under deformation with capacity to expand longitudinally.

WILLIAM E. LEIBING.
ROLLIE B. FAGEOL.